US008291465B2

(12) United States Patent
Sussman

(10) Patent No.: US 8,291,465 B2
(45) Date of Patent: Oct. 16, 2012

(54) TELEVISION SYSTEM TO EXTRACT TV ADVERTISEMENT CONTACT DATA AND TO STORE CONTACT DATA IN A TV REMOTE CONTROL

(76) Inventor: Lester Sussman, Bethesda, MD (US)

( * ) Notice: Subject to any disclaimer, the term of this patent is extended or adjusted under 35 U.S.C. 154(b) by 1314 days.

(21) Appl. No.: 10/679,206

(22) Filed: Oct. 6, 2003

(65) Prior Publication Data

US 2005/0076393 A1    Apr. 7, 2005

(51) Int. Cl.
*H04N 7/08* (2006.01)

(52) U.S. Cl. ............ 725/137; 725/38; 725/46; 455/566; 348/735

(58) Field of Classification Search .................. 725/137, 725/81
See application file for complete search history.

(56) References Cited

U.S. PATENT DOCUMENTS

| | | | | | |
|---|---|---|---|---|---|
| 4,701,794 | A | * | 10/1987 | Froling et al. | 348/468 |
| 4,751,578 | A | * | 6/1988 | Reiter et al. | 348/564 |
| 4,991,017 | A | * | 2/1991 | Raaijmakers | 348/468 |
| 5,410,326 | A | * | 4/1995 | Goldstein | 348/734 |
| 5,708,478 | A | * | 1/1998 | Tognazzini | 348/552 |
| 5,898,919 | A | * | 4/1999 | Yuen | 455/420 |
| 5,973,747 | A | * | 10/1999 | Goreta | 725/136 |
| 5,978,013 | A | * | 11/1999 | Jones et al. | 725/23 |
| 5,987,033 | A | * | 11/1999 | Kabasawa | 370/331 |
| 6,002,450 | A | * | 12/1999 | Darbee et al. | 348/734 |
| 6,021,185 | A | * | 2/2000 | Staron | 379/93.17 |
| 6,064,439 | A | * | 5/2000 | Kimura et al. | 348/468 |
| 6,124,854 | A | * | 9/2000 | Sartain et al. | 715/716 |
| 6,278,499 | B1 | * | 8/2001 | Darbee et al. | 348/734 |
| 6,628,729 | B1 | * | 9/2003 | Sorensen | 375/316 |
| 6,882,299 | B1 | * | 4/2005 | Allport | 341/176 |
| 2003/0005463 | A1 | * | 1/2003 | Macrae et al. | 725/112 |
| 2003/0014754 | A1 | * | 1/2003 | Chang | 725/60 |

(Continued)

FOREIGN PATENT DOCUMENTS

GB    2352600 A    *    1/2001

(Continued)

OTHER PUBLICATIONS

Folke Olander and Preben Sepstrup, The Use of Electronic Media for Advertising and Selling: A Consumer Policy Outline, Reidal Publishing Company, Journal of Consumer Policy 10, 1987, p. 287.*

(Continued)

*Primary Examiner* — Vivek Srivastava
*Assistant Examiner* — Anthony Bantamoi

(57) ABSTRACT

A television advertisement system whereby a viewer retrieves advertisement teletext contact information of an advertisement that has been displayed on the viewer's television by using a wireless remote control device. The invention provides the means for a viewer to easily obtain ad' contact information, in-hand, which can then be used at will. Teletext data is associated with an advertisement video signal, which is then decoded and stored in the television's or TV's set-top box's page memory. The viewer can retrieve, on demand, the advertisement's teletext data stored in the television's, or set-top box's page memory by using a wireless remote control. The advertisement data is transferred to and stored in the remote control's memory. The data is displayed on the remote's screen. The data stored in the remote control can be used to automatically contact an advertiser for further information, or to purchase an advertised product or service. This is achieved by wirelessly transferring pertinent contact information from the remote control to various communication devices, such as a computer, a telephone, a PDA, etc.

20 Claims, 3 Drawing Sheets

U.S. PATENT DOCUMENTS

| | | | |
|---|---|---|---|
| 2003/0050045 A1* | 3/2003 | Kennedy | 455/412 |
| 2003/0114199 A1* | 6/2003 | Takeyasu | 455/566 |
| 2003/0208773 A1* | 11/2003 | Jotikasthira | 725/114 |
| 2005/0110909 A1* | 5/2005 | Staunton et al. | 348/734 |

FOREIGN PATENT DOCUMENTS

WO    WO 03085965 A1 * 10/2003

OTHER PUBLICATIONS

Philips (TM) Semiconducors, "Data Sheet SAA5264; SAA5265 10 and 1 Page Intelligent Teletext Decoders", Jan. 27, 2000, pp. 1-2,4.

Intersil (TM), "HMP8117 Decoder Device Information Sheet", www.intersil.com/design/parametric/deviceinfo.asp?pn=HMP8117, Sep. 24, 2003, pp. 1-2.

Bruce Brown, "Is There A Way to Use a PDA as a Remote Control for a Home Entertainment System?", Sep. 17, 2002, p. 93, PC Magazine, USA.

Greg Vrana, "Untangling IRDA and Bluetooth", Sep. 27 2001, pp. 57-58,60,62, EDN Magazine, USA.

\* cited by examiner

TELEVISION SYSTEM TO EXTRACT TV ADVERTISEMENT CONTACT DATA AND TO STORE CONTACT DATA IN A TV REMOTE CONTROL

BACKGROUND OF THE INVENTION

1. Field of the Invention

The invention relates to a system for receiving television advertisement associated textual data and for a viewer to obtain, on demand, the textual data in-hand using a television remote control device.

2. Description of Related Art

Whenever an advertisement (ad') appears on the television (TV) and the viewer is interested in following up on the displayed product, today he must either remember the product contact information, or scribble down the information on a piece of paper. Another option is to have a telephone within reach and to dial the phone number displayed in the advertisement.

The current invention uses a readily available feature of TV signals, namely the teletext standard to transmit advertisement data to a television viewer. The viewer then uses his remote control to selectively acquire the displayed ad's data and thereby to have the advertisement related data at hand for use.

Generally, in the USA, teletext is not greatly used, as it is in Europe and other global regions. In the USA, closed captioning (CC) is commonly available on most TV sets and TV set-top boxes. Closed captioning is a specific use of teletext in the USA, i.e. as an aid to deaf TV viewers.

Goreta teaches in U.S. Pat. No. 5,973,747 a TV program management system to display and control TV programs. Goreta also teaches the display of program information on the TV screen as well as on a remote control device. Goreta does not teach the retrieval, display and interaction of a viewer with TV advertisements as the present invention teaches, but is focused on television viewing program management.

Darbee et al. teaches in U.S. Pat. No. 6,002,450 a remote control unit that displays television advertisements. Darbee et al. teaches that the remote control is in effect an extension of the television viewing space to capture a viewer's attention with advertisements. This is taught by the use of the remote control whilst it is not being used by the viewer, i.e. ad's are broadcast to the remote without a viewer's request or interaction. It is also taught that time based display of advertisements is offered on the remote control's display, i.e. similar as to how advertisement space is sold on televisions.

SUMMARY OF THE INVENTION

The present invention's primary objective is a system whereby a television viewer retrieves advertisement contact information of an advertisement that is, or has been displayed on the viewer's television by using a wireless remote control device. One of the key premises to advertising is for the advertised product or service to be purchased. The invention provides the means for a viewer to easily obtain ad' contact information, in-hand, which can then be used at will.

The present invention teaches the use of teletext data associated with an advertisement video signal, which is then decoded and stored in the television's or TV's set-top box's page memory.

The viewer can retrieve, on demand only, the advertisement's teletext data stored in the television's, or set-top box's page memory by using a wireless remote control. The advertisement data is transferred to and stored in the remote control's memory. The data is displayed on the remote's screen. No advertisement data is transmitted to the remote control without the viewer's explicit interaction.

The viewer can retrieve, display and delete any advertisement data stored in the remote control's memory, at any time, even if the TV is switched off.

The data stored in the remote control can be used to automatically contact an advertiser for further information, or to purchase an advertised product or service. This is achieved by wirelessly transferring pertinent contact information from the remote control to various communication devices, such as a computer, a telephone, a PDA, etc.

DETAILED DESCRIPTION OF THE PREFERRED EMBODIMENT

Figure 1:
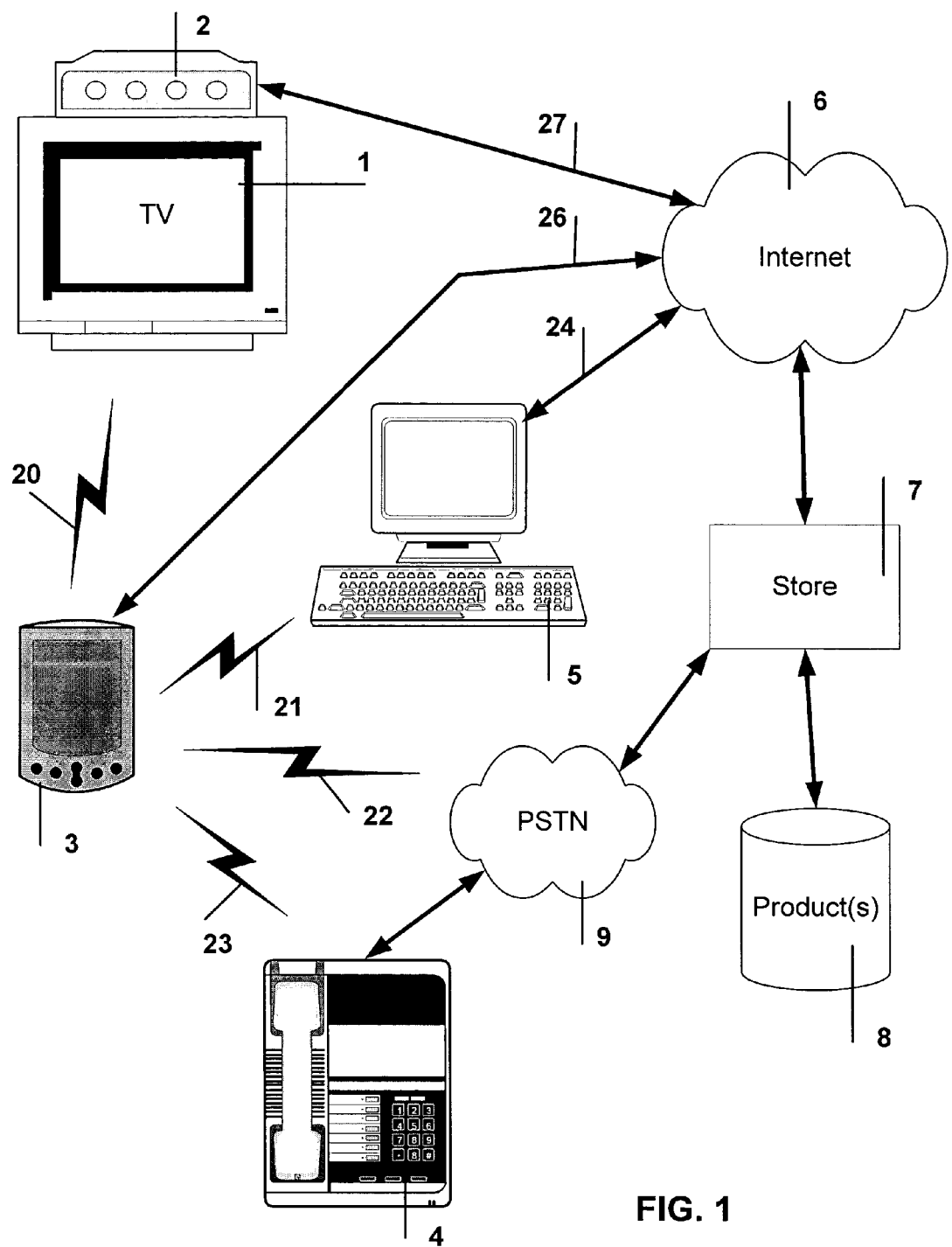
FIG. 1 is a block diagram of the various components of the present invention.

The preferred embodiment's description is detailed in the following sections:
1. Overview of Teletext
2. Advertisement Teletext Format
3. Hardware Overview
   3.1 Set-top Box
   3.2 Remote Control Unit
4. Receiving and Storing Advertisements
5. Downloading an Advertisement to the Remote Control
6. Contacting Advertisers Using the Remote Control We now consider each of these sections in further detail.

1. Overview of Teletext

The preferred embodiment of the invention uses a common feature of today's television systems, i.e. teletext. Teletext is a technology used to deliver data within an analog video signal by using the vertical blanking interval (VBI) between lines of active video. The VBI is a generally unused space located between the vertical synch pulse and the actual active video picture. Because of the limited number of available lines in the VBI, the actual amount of data that can be transmitted is limited to about 17.76 Kbits/sec times the number of transmitted lines. The data represents pages of information to be displayed on a television screen.

Various teletext formats are available including the World System Teletext, (WST), the North American Broadcast Teletext Specification (NABTS) and others.

The teletext standards used by broadcasters all over the globe are defined in the International Telecommunication Union's ITU-R BT.653-2 document. The European teletext is defined as "teletext system B" for 625/50 Hz TV systems. NABTS teletext is defined as "teletext system C" for 525/60 Hz TV systems. WST for PAL is defined as "teletext system D" for 625/50 Hz TV systems and WST for NTSC is defined as "teletext system D" for 525/60 Hz TV systems.

Semiconductor manufacturers provide video encoders and decoders that encode and decode multiple teletext standards. For example, Intersil™'s HMP8117 decoder handles closed captioning, NABTS, WTS and BT.653 System B, C and D teletext. Cirrus Logic™'s encoders CS4954 and CS 4955 support closed captioning in NTSC and teletext for NTSC and PAL.

Most modern television sets have built-in teletext decoders. For example Sharp™ Corporation's 19R-M100 and Panasonic™'s CT-36SL13 TVs support closed captioning decoding and display. Hitachi™'s C50F550 TV system supports teletext decoding and display.

The insertion, i.e. encoding of teletext information into video signals is commonly available and is covered by many patents and available products, e.g. MRG Systems™ DTP800 Digital Databridge and CT700 Teletext Scheduler and Optimum Technology™'s OPT-III Teletext Encoder.

Today TV broadcasting is graduating into the digital world, a technology without VBI. Analog teletext does not exist in digital television (DTV). Digital teletext is evolving with the evolution of DTV. The current standard for digital teletext is the Multimedia Hypermedia Experts Group open standard called MHEG-5, which is described in the International Organization for Standardization (ISO™) document ISO/IEC 13522-5. In DTV, graphics data can be incorporated, together with text data into digital teletext, which can then be decoded and displayed. So for example, a company's graphic logo could be embedded in digital teletext.

The important thing to note is that the current invention does not exclude digital television broadcasting, but uses analog television broadcasting in its preferred embodiment. To those knowledgeable in the art, it is obvious that teletext embedded in a digital video signal can be decoded at the viewer's end of the transmission. A number of broadcasters, i.e. the BBC™ and BSkyB™ have such digital systems on trial today.

2. Advertisement Teletext Format

In the invention's preferred embodiment, the teletext associated advertisement data stream consists of a number of paired data fields, i.e. an identifier tag field and an associated attribute field.

Each advertisement teletext stream is prefixed with a tag <AD> to distinguish it from other teletext information, such as closed captioning. At the end of the advertisement teletext transmission is a termination tag </D>. These two tags enable the Microcontroller 32 to process the advertisement teletext information more easily. Furthermore, the stream of data between these two tags represent one page of advertisement teletext data.

The format of the teletext advertisement (i.e., the ad's teletext page) is as follows, and is transmitted left to right, top to bottom:

<AD><N> product name <$> product cost <S> shipping cost <#> phone-number <W> web addr. <M> mail addr. <P> payment </D>

Table 1 further describes the advertisement teletext transmission format. Note that the format of these tags can be other descriptors besides those used in the preferred embodiment of the invention. For example, the product's nametag could be {NAME}, or [PROD], etc. Furthermore the present invention does not exclude the use of other fields, for example expiration date/time for the ad's offer (tag <E>), or email address (tag <@>), etc.

Not all advertisements have data for all of the fields. In this case, it can be handled in one of two ways:

(a) All of the fields are transmitted and where no data is available, the attribute field pair is blank. For example, say a product only has a name and a web address, and then the advertisement teletext transmission stream is as follows:

<AD><N>product name<$><S><#><W>web addr.<M><P></D>

(b) The second option is such that unused fields are not transmitted. For example, say a product only has a name and a web address, and then the advertisement teletext transmission is as follows:

<AD><N>product name<W>web addr.</D>

The preferred embodiment of the invention uses option (b), i.e. unused fields are not transmitted. This option saves on encoding the ad' transmission, decode processing resources, storage memory 35 usage (i.e. page memory), etc.

TABLE 1

| Field | Field Tag | Attribute of Field |
|---|---|---|
| Ad Start | <AD> | Blank attribute field. |
| Product Name | <N> | Name of the product. |
| Product Cost | <$> | Cost of product. |
| Shipping Cost | <S> | Cost to ship product. |
| Phone Number | <#> | Phone number to call to inquire further about the product. |
| Web Address | <W> | Web site address where further product information is available. |
| Mail Address | <M> | Product distributor's mailing address. Can be used to mail a check, mail order, etc. for payment. |
| Payment | <P> | Type of payment accepted, e.g. check, mail order, Visa ™, Mastercard ™, American Express ™, etc. |
| Ad End | </D> | Blank attribute field. |

3. Hardware Overview

Referring to FIG. 1, the preferred embodiment consists of a television 1, a set-top box 2 and a remote control 3. A video signal is received by the set-top box 2 with embedded teletext that is associated with an advertisement to be displayed, or is being displayed on the TV 1. The remote control 3 has a display screen, a wireless transceiver to communicate with other wireless devices, data memory, control circuitry (e.g. a microprocessor), and keyboard keys to interact with the TV viewer.

3.1 Set-top Box

Figure 2:
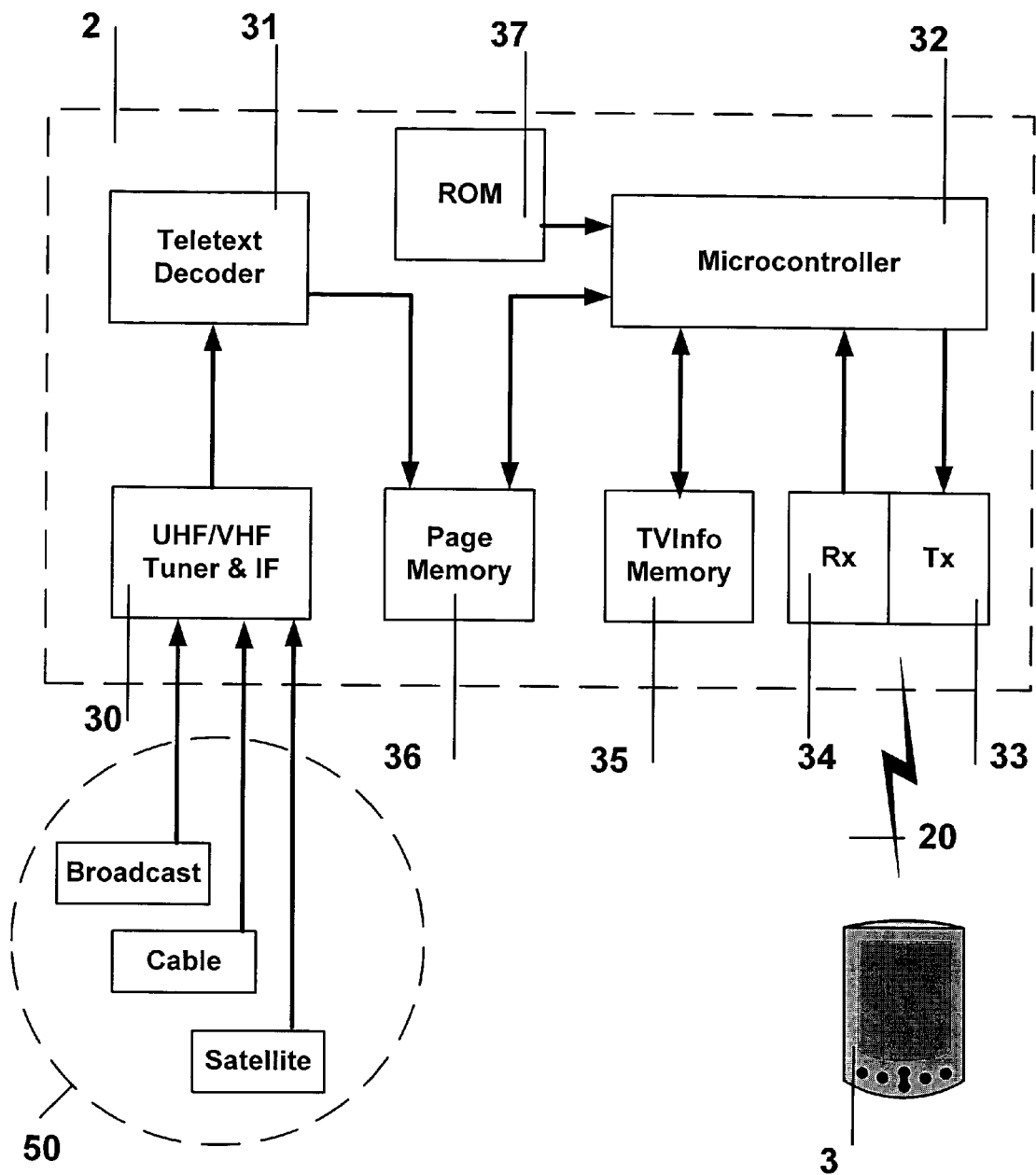
FIG. 2 is a block diagram of the key components of the invention's television set-top box.

The set-top box 2 comprises the following components as illustrated in FIG. 2:

(3.1.1) A UHF/VHF Tuner and IF 30 circuit that receives the transmitted video signal and converts it into a signal that the Teletext Decoder 31 can process.

(3.1.2) A Teletext Decoder 31 circuit that extracts the transmitted pages of teletext data from the broadcast 50 video signal.

(3.1.3) Page Memory 36 circuit in which non-advertisement teletext is stored by the Microcontroller 32.

(3.1.4) TVInfo Memory 35 that stores extracted pages of advertisement teletext data.

(3.1.5) A Microcontroller 32 that controls all processing circuits in the set-top box 2 and processes commands sent to it by the remote control unit 3.

(3.1.6) A wireless transmitter Tx 33 circuit that transmits data to the remote control 3.

The preferred embodiment of the invention implements this wireless circuit as an infrared (IR) circuit. IR devices are commonly used in remote control units, as well as other handheld devices, such as PDAs. Any other commercially available wireless transmitter technology could as easily be used in the invention, e.g. short-range Radio Frequency (RF) products such as Ericsson™'s Bluetooth™ enabled transceivers.

(3.1.7) A wireless receiver Rx 34 circuit that receives data transmitted from the remote control 3. The same wireless technology that applies to the Tx 34 circuit, applies to this circuit. The preferred embodiment of the invention implements IR technology, because of its ubiquity and relative ease for retrofitting the present invention into current art.

(3.1.8) Read Only Memory, i.e. ROM 37 contains all programs that the Microcontroller 32 requires to control the functions on the set-top box 2.

Note that all of the functionality of the set-top box 2, as previously mentioned could as easily be implemented in the TV 1. The preferred embodiment of the invention does not exclude this implementation in a TV 1.

3.2 Remote Control Unit

Figure 3:
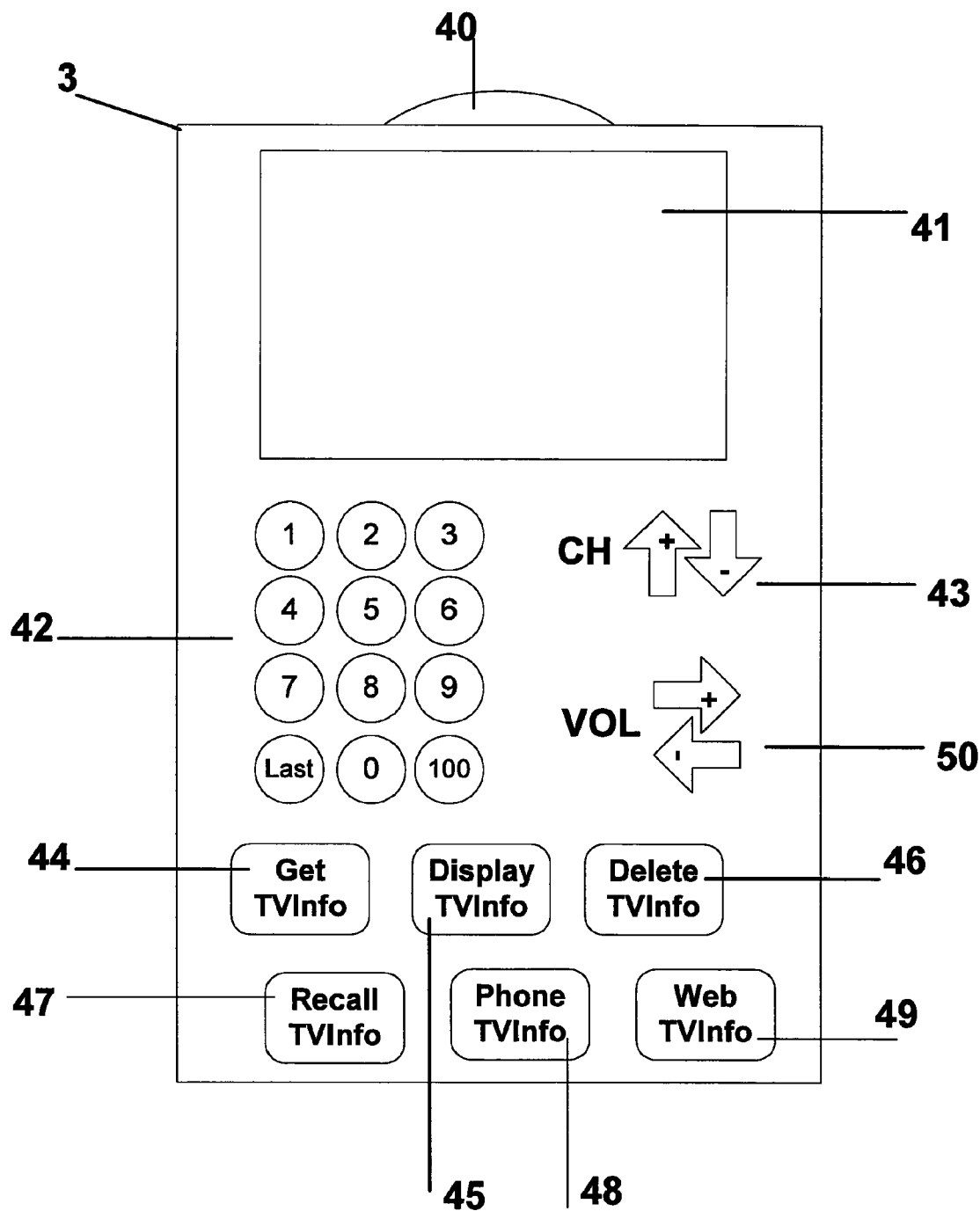
FIG. 3 is a plan view of the present invention's remote control unit.

The Remote Control unit 3 comprises the following components as illustrated in FIG. 3:

(3.2.1) A wireless transceiver 40 that communicates with the Tx 33 and Rx 34 transceiver circuits on the set-top box 2. Note that this is obviously the same wireless technology used on the set-top box 2.

(3.2.2) A display screen 41 on which data is displayed. The preferred embodiment uses an LCD display, e.g. the Kyocera KHS038AA1AJ-L89 240×320 pixel display.

(3.2.3) Standard channel input number keys 42. These keys could be used to retrieve directly various ad's stored in the remote control 3.

(3.2.4) Channel Navigation keys 43 that are used to browse TV channels as well as to browse advertisement teletext data stored both in the remote control 3 and in TVInfo Memory 35.

(3.2.5) Get-TVInfo 44 key to request transmission of the currently displayed TV ad's page of teletext data from the set-top box 2 to the remote control 3. Note that the remote control 3 has non-volatile memory (NVRAM) and related control circuitry to store the requested page of ad' teletext data received from the set-top box 2.

(3.2.6) Display-TVInfo 45 key to request a display on the remote control' screen 41 of ad' teletext data currently stored in the remote control's NVRAM. If more than one ad' page is stored in the remote control's NVRAM, the viewer can use the Channel Navigation keys 43 to browse through the previously stored pages of ad's.

(3.2.7) Delete-TVInfo 46 key to delete the currently displayed ad's page of data on the remote control unit's screen 41 from the remote control's NVRAM memory.

(3.2.8) Recall-TVInfo 47 key to request a display on the TV 1 screen of ad' teletext data pages currently stored in the set-top box's TVInfo Memory 35. The viewer then uses the Channel navigation 43 keys to browse the stored pages of ad' data, which is displayed on the TV 1 screen.

(3.2.9) Phone-TVInfo 48 key to dial the displayed ad' data's phone number that is displayed on the remote control unit's screen 41. For this key to work one of two features must be available (referring to FIG. 1):

(a) The remote control unit 3 is enabled to connect wirelessly 22 to the Public Switched Telephone Network 9 (PSTN 9); or (b) To wirelessly transmit 23 to a telephone 4 a request to dial the displayed phone number, e.g. via DTMF signals.

(3.2.10) Web-TVInfo 49 key to connect to the displayed ad's web address, i.e. displayed on the remote control's screen 41, either (see FIG. 1):

(a) directly 26, or;

(b) via the set-top box 27, or;

(c) via a computer 24.

(3.2.11) Volume keys 50 for the TV 1.

With reference to FIG. 1 and FIG. 3, a viewer uses a remote control 3 to interact with the set-top box 2 in order to obtain the associated page of ad' information for later, or immediate use. The ad' page of information is retrieved from TVInfo Memory 35, transmitted from the set-top box 2 to the remote control 3, stored in the remote control's memory NVRAM and displayed on the remote control's screen 41.

The viewer can review the ad' information page that he has retrieved and stored on his remote control 3. The viewer can then contact the product 8 distributor and inquire further, or purchase the product or service. Purchasing can be made via:

a) A telephone 4;

b) A computer 5 on the Internet 6; or c) Directly from the remote control device 3, provided, that the device can connect to the Internet 6 or the PSTN 9.

Universal Electronics™ has software called Nevo™ that runs on personal digital assistants (PDAs) such as the HP™ iPAQ™ Pocket PC H3950 and H5400. Nevo software enables the PDA to be used as a remote control 3. The Sony™ Clié™ PEG-NR70v PDA comes with software called Remote Commander™ that enables the PDA to be used as a remote control 3. It is well known in the art that PDAs can be used to connect 22 to the PSTN 9 and to connect 26 to the Internet 6 via a fax/modem card.

Note that the various remote control 3 keys could be implemented, with relative ease as touch-screen options on the remote control's screen 41. Various manufacturers of remote control units have touch-screen circuitry. For example, the Philips™ TSU ProntoNEO™ Intelligent A/V remote control has a touch screen display. The preferred embodiment of the invention uses keys as described above, but does not exclude the use of such a touch-screen system.

4. Receiving and Storing Advertisements

The patent is focused specifically on the retrieval, in-hand, of advertisement information by a television viewer, which the viewer is interested in. With reference to FIG. 1, FIG. 2 and FIG. 3, we now consider this aspect of the invention.

A television 1 is connected to a TV set-top box 2 and a remote control unit 3 is used to control the TV viewing functions.

Embedded in the invention's set-top box 2 are electronic circuits that retrieve pages of teletext information that have been attached to the video signal. FIG. 2 depicts a preferred embodiment of the set-top box 2. The preferred embodiment of the invention has used a set-top box 2, but as mentioned previously these circuits can be embedded directly into a TV set 1. One of the reasons for using a set-top box 2 is because it is relatively easy to either add a new or upgraded set-top box 2, or replace a current set-top box 2 in order to use the current invention with old TV sets.

An originating broadcaster 50, via cable television, satellite television or broadcast television, transmits the video signal. The video signal has been embedded with advertisement teletext at an originating point before being transmitted. It is important to note that the ad' teletext is only embedded in the originating video signal when an ad' video is broadcast. In other words, in the preferred embodiment, ad's page of teletext is directly associated with an advertisement video signal. This is important, because the goal of the present invention is for a viewer to capture data associated with a specific ad' that he is viewing, or has been displayed on the TV 1 and is interested in. Otherwise, it would be like viewing junk mail, with a person having to wade through unwanted mail to retrieve something of interest.

When the receiver, i.e. the set-top box 2 or the TV 1 with embedded decoder circuits, receives a video signal via the UHF/VHF Tuner and IF circuit 30, the video signal is passed onto the Teletext Decoder 31. The Teletext Decoder 31 and Microcontroller 32 are generally part of the same commercially available integrated circuit. For example, Philips™ Semiconductors has an intelligent teletext decoder, the SAA5264 and the SAA5265 that incorporate Intel™'s 80C51 microcontroller. FIG. 2 has separated these two circuits for illustrative purposes only.

The Teletext Decoder 31 extracts the page of ad' teletext data from the video signal and stores it in Page Memory 36. Whenever new page of ad' data is stored in Page Memory 36, the Microcontroller 32 moves the page of data into separate memory, the TVInfo Memory 35. Commercially available teletext decoders generally have limited memory to store teletext in. For example, the SAA5264 can only store a single page of teletext and the SAA5265 can store ten pages of teletext. Using separate storage memory, i.e. TVInfo Memory 35, enables the invention to store more advertisements for later recall by the viewer (via the Recall-TVInfo 47 key.). TVInfo Memory 35 is implemented as Non-Volatile Random Access Memory (NVRAM) in order to retain ad' data even if the set-top box 2 (or TV 1 depending on the implementation of the teletext decoder) has been powered down.

It is feasible to store the ad' data in Page Memory 36 rather than separate TVInfo Memory 35, but the preferred embodiment of the invention uses separate memory.

The preferred embodiment of the invention stores pages of ad' data in the TVInfo Memory 35 as it is received in a First-In-First-Out (FIFO). When the memory 35 is full, the microcontroller 32, overwrites the first received and stored page of ad' data with the newly received data page. This feature enables the viewer to browse any advertisements that have been received and stored in the TVInfo Memory 35. The invention does not preclude other data storage techniques such FILO, indexed, etc. from being used.

Once the associated ad' data is stored in the TVInfo Memory 35, it is available for the viewer to download into his remote control unit 3.

5. Downloading an Advertisement to the Remote Control

With reference to FIG. 1 and FIG. 3, we now consider how the invention enables the viewer to retrieve two types of advertisements stored in TVInfo Memory 35:

(5.a) A real-time displayed ad'; and
(5.b) A previously broadcast TV ad'.

(5.a) In the first case, i.e. real-time ad' display, the ad' being displayed on the TV 1 screen has associated teletext data stored in memory 35 on the set-top box 2. In this case, the viewer is watching the ad' on TV 1 and wishes to capture the associated page of ad' information for use. The viewer uses his remote control 3 to send a request to the set-top box 2 via a wireless interface 40 on his remote control. This is done by selecting the Get-TVInfo 44 key located on his remote control 3. The set-top box 2 has a wireless receiver Rx 34 that captures the viewer's remote control request and passes this request to the microcontroller 32 to process. The Microcontroller 32 then retrieves the ad's data page from memory 35 and transmits it to the viewer's remote control 3 via the wireless transmitter Tx 33. Once the remote control 3 receives the ad's page of data, it displays it on the remote control's screen 41 and stores the data page in the remote's NVRAM.

(5.b) In the second case, i.e. the viewer is interested in a previously displayed TV ad'; he selects the Recall-TVInfo 47 key on the remote control 3. The remote control 3 sends the recall request to the set-top box 2 via a wireless interface 40 on his remote control. The set-top box 2 has a wireless receiver Rx 34 that captures the viewer's remote control request and passes this request to the microcontroller 32 to process. The microcontroller 32 then retrieves advertisements' data pages, that it stored FIFO in TVInfo Memory 35. This information is then displayed on the TV 1. The viewer browses the displayed ad' list by using the channel keys 43 on his remote control 3. If he locates an ad' page that he wishes to retain on his remote control 3, he simply selects the Get-TVInfo 44 key on the remote control 3, and it is transmitted 20 via the Tx 33 circuit by the Microcontroller 32 to the remote control 3. The remote control 3 displays the information on its screen 41 and stores the ad' data in its NVRAM.

6. Contacting Advertisers Using the Remote Control

With reference to FIG. 1 and FIG. 3, we now consider how the present invention helps the TV viewer to contact TV advertisers about a product 8, or service.

Once the viewer has stored an ad's data page about a Product(s) 8 in his remote control 3, the viewer can then contact the advertiser by:

(6.1) Displaying the ad' information page on the remote control's screen 41 and jot down the information for later use, or using the displayed contact information to call, manually, the advertiser (e.g. the Store 7) using a telephone 4, or using a computer 5 to connect to the displayed web site on the Internet 6, for further processing.

(6.2) Using the displayed information on the remote control's screen 41 to connect indirectly 21 to the Store 7 via a computer 5. This feature requires that the computer 5 has been enabled to receive wireless transmissions 21 from the remote control 3, similar to how the TV 1 processes wireless commands sent to it from the remote control 3. The wireless transmission 21 consists of a connect command, as well as the advertised web address, i.e. the web address tag and attribute pair. A program resident on the Computer 5 would then connect 24 via the Internet 6 to the Store 7 to inquire further on the advertised Product(s) 8, or to enable the viewer to order the Product(s) 8. Note that the computer's Internet connection 24 is by any means that is available in the current art, e.g. dial-up analog access (wireline or wireless), cable broadband access, xDSL broadband access, Wi-Fi hotspot access, etc.

(6.3) Using the displayed information on the remote control's screen 41 to connect directly 22 to the Store 7 via the PSTN 9. This feature of the remote control 3 connecting directly to the Store 7 was mentioned above in the section 3.2 Remote Control Unit and is achieved by using a fax/modem card, which is part of the remote control 3, e.g. such as a multi-function PDA.

(6.4) Using the displayed information on the remote control's screen 41 to connect to the Store 7 via the PSTN 9 and the telephone 4. This feature would require the telephone 4 to be able to receive a wireless transmission 23 from the remote control 3. This feature would require the telephone 4 to be able to process wireless commands, similar to how the TV 1 processes wireless command sent to it from the remote control 3.

Note that many TV advertised products do not have a distributor or Store 7 to contact, but are simply raising the awareness of the viewer to the products availability. Examples for this type of advertising include cosmetic products, detergent products, motor vehicles, multi-national corporations, etc. At best, these types of advertisements may have an associated web site.

Another feature that is not displayed in FIG. 1. is that the remote control 3 could have a wireless interface to a printer (e.g. the HP™ Deskjet™ 995c Bluetooth™ and IR enabled printer). This feature would allow the viewer to obtain a hardcopy of the advertised product information that he stored in the remote control 3. Another feature not displayed in FIG. 1. is the capability of transmitting the displayed page of information from the remote control 3 to a PDA. Wireless communication between PDAs is common technology in the art.

What is claimed is:

1. An active television apparatus to extract on-demand television advertisement contact information by a television viewer comprising:
   (a) a television receiver in said active television apparatus for receiving a television advertisement picture signal having a television advertisement data signal embedded therein, wherein said television advertisement data signal representing a page of teletext data in said television advertisement picture signal,
   wherein said television advertisement picture signal displayed on said active television apparatus,
   (b) a data acquisition circuit for acquiring said page of teletext data in said television advertisement picture signal,
   wherein said page of teletext data in said television advertisement picture signal comprising a teletext advertisement contact data block and other teletext data block, said teletext advertisement contact data block comprising a plurality of data, said plurality of data including contact information to contact a representative of said television advertisement picture signal by said television viewer,
   wherein said teletext advertisement contact data block embedded in said television advertisement picture signal occurring at an advertisement teletext block insertion time, said advertisement teletext block insertion time occurring in non real-time to said television advertisement picture signal transmission to said active television apparatus,
   wherein said teletext advertisement contact data block available for acquisition by said data acquisition circuit during display of said television advertisement picture signal on said active television apparatus,
   (c) a first memory in said active television apparatus for storing simultaneously a plurality of said teletext advertisement contact data block,
   (d) a second memory in said active television apparatus for storing simultaneously a plurality of said other teletext data block,
   (e) a first display in said active television apparatus for generating images representative of selected portions by said television viewer of said teletext advertisement contact data block,
   (f) a first block selection means for selecting by said television viewer said teletext advertisement contact data block for display by said television viewer on said first display in said active television apparatus,
   (g) a first wireless transceiver circuit in said active television apparatus for (1) transmitting said teletext advertisement contact data block to a remote control device upon receiving a request signal from said remote control device for said first block selection of said television advertisement picture signal, and for (2) receiving a set of teletext advertisement contact data block navigation instructions into said active television apparatus, said teletext advertisement contact data block navigation instructions to navigate by said television viewer, a plurality of said teletext advertisement contact data block stored simultaneously in said first memory in said active television apparatus,
   (h) a second block selection means for selecting by said television viewer said teletext advertisement contact data block for display by said television viewer on a second display on said remote control device,
   (i) a third block selection means for selecting by said television viewer said teletext advertisement contact data block for transmission to said remote control device, from said first memory, and
   (j) a microcontroller in said active television apparatus coupled to said first memory, said second memory, said first display, said first block selection means, said second block selection means, said third block selection means, and said first wireless transmitter circuit, and
   wherein said microcontroller in said active television apparatus being (1) configured to cause delivery of a set of television control signals to said first wireless transmitter circuit upon receiving a set of signals from said remote control device via said first wireless transmitter circuit and (2) to select said teletext advertisement contact data block, stored in said first memory in said active television apparatus, to be displayed by said television viewer on said first display in said active television apparatus in response to a request signal received from said remote control device.

2. The active television apparatus in claim 1, wherein said first block selection means, said second block selection means and said third block selection means comprise a remote control device having a plurality of command keys.

3. The teletext in claim 1 is selected from the group comprising an analog teletext system and a digital teletext system.

4. The wireless transceiver circuit in claim 1 being selected from the group consisting of an infrared circuit and a Bluetooth-enabled circuit.

5. The television apparatus of claim 1 wherein said selected teletext advertisement contact data block is transmitted and printed on a printing device by said television viewer.

6. The television apparatus in claim 1, wherein said teletext advertisement contact data block comprises a first tag marking a start of said teletext advertisement contact data block, and a second tag marking an end of said teletext advertisement contact block,
   wherein said first tag and said second tag uniquely distinguishing said teletext advertisement contact data block from said other teletext data block.

7. A remote control device to extract on-demand television advertisement contact information of a television advertisement picture signal displayed on an active television apparatus by a television viewer comprising:
   (a) said television advertisement picture signal comprising a page of television teletext data embedded therein,
   wherein said page of television teletext data comprising a teletext advertisement contact data block and other teletext data block, said teletext advertisement contact data block comprising a plurality of data, said plurality of data including contact information to contact on-demand by said television viewer a representative of said television advertisement picture signal,
   (b) a first memory in said active television apparatus for storing simultaneously a plurality of said teletext advertisement contact data block, wherein said teletext advertisement contact data block embedded in said television advertisement picture signal occurring at an advertisement teletext block insertion time, said advertisement teletext block insertion time occurring in non real-time to said television advertisement picture signal transmission to said television apparatus, wherein said television advertisement picture signal received and displayed on said active television apparatus, wherein said teletext advertisement contact data block available for acquisition by a data acquisition circuit in said active television apparatus during display of said television advertisement picture signal on said active television apparatus, (c) a second memory in said active television apparatus for storing simultaneously said other teletext data block, (d) a third memory in said remote control device for storing simultaneously a plurality of said teletext advertisement contact data block, each of said teletext advertisement contact data block selected and stored on-demand by said television viewer in said third memory, wherein said selected and stored teletext advertisement contact data block associated with said television advertisement picture signal displayed on said active television apparatus, wherein said active television apparatus is a first electronic device and wherein said remote control device is a second electronic device, (e) a display in said remote control device for generating images representative of selected portions by said television viewer of said television advertisement picture signal and said teletext advertisement contact data block, (f) a user input device in said remote control device for enabling (1) input of television channel selection, (2) input of television volume control, (3) a set of television advertisement teletext advertisement contact data block navigation instructions by said television viewer, including (4) a selection input by said television viewer of said television advertisement picture signal displayed on said active television apparatus, and (5) a set of communications instructions into said remote control device, (g) a wireless transceiver circuit in said remote control device for transmitting (1) a set of control signals and (2) a set of data signals to said active television apparatus and a third electronic device, and (3) for receiving an on-demand selection by said television viewer of said teletext advertisement contact data block from said active television apparatus, and (h) a microprocessor in said remote control device coupled to said third memory, said display, said user input device and said wireless transmitter circuit in said remote control device, wherein said microprocessor in said remote control device being configured to cause delivery of (1) said set of control signals and (2) said set of data signals to said wireless transmitter circuit and (3) to select by said television viewer said teletext advertisement contact data block to be displayed on said display in said remote control device in response to said set of communications instructions received from said user input device, and wherein said television advertisement teletext data is selected from the group comprising an analog teletext system and a digital teletext system.

8. The remote control device of claim 7, wherein said set of communications instructions executed by said television viewer include:

(i) retrieval by said television viewer and display on said display in said remote control device of said teletext advertisement contact data block for an advertisement displayed on said active television apparatus;

(ii) retrieval by said television viewer and display on said display in said remote control device of said teletext advertisement contact data block stored in said active television apparatus first memory of a television advertisement picture signal previously displayed on said active television apparatus;

(iii) selection and deletion by said television viewer of said teletext advertisement contact data block stored in said first memory in said active television apparatus; and (iv) retrieval by said television viewer of said teletext advertisement contact data block stored in said active television apparatus first memory of a television advertisement picture signal currently displayed on said active television apparatus.

9. The remote control device of claim 7, wherein said set of communications instructions executed by said television viewer include:

(v) retrieval by said television viewer and display on said display in said remote control device of said teletext advertisement contact data block stored on-demand by said television viewer in said third memory in said remote control device;

(vi) transmission of said retrieved teletext advertisement contact data block, on-demand by said television viewer to said third electronic device from said remote control device; and (vii) selection and deletion by said television viewer of said teletext advertisement contact data block stored on-demand by said television viewer in said third memory in said remote control device.

10. The third electronic device in claim 9 being selected from the group consisting of a telephone, a computer, a personal digital assistant device and a television set-top box, and
wherein said third electronic device comprising an electronic device other than said first electronic device and said second electronic device.

11. The wireless transceiver circuit in claim 7 being selected from the group consisting of an infrared circuit and a Bluetooth-enabled circuit.

12. The remote control device in claim 7 wherein said selected teletext advertisement contact data block is transmitted and printed on a printing device by said television viewer.

13. The remote control device of claim 7, wherein said teletext advertisement contact data block comprises a first tag marking a start of said teletext advertisement contact data block, and a second tag marking an end of said teletext advertisement contact data block,
wherein said first tag and said second tag uniquely distinguishing said teletext advertisement contact data block from said other teletext data block.

14. A method to extract on-demand television advertisement contact information by a television viewer comprising the steps:

(a) embedding said television advertisement contact information in a television picture signal of a television advertisement;
wherein said embedded television advertisement contact information embedded in a page of teletext data,
wherein said page of teletext data comprising a teletext advertisement contact data block and other teletext data block, said teletext advertisement contact data block comprising a plurality of data, said plurality of data including contact information to contact a representative of said television advertisement by said television viewer;

(b) receiving a multiplicity of said television advertisement and said teletext advertisement contact data block on an active television apparatus;

(c) extracting a multiplicity of said teletext advertisement contact data block of said television advertisement, each of said teletext advertisement contact data block associated with a television advertisement picture signal of said television advertisement displayed on said active television apparatus, and storing simultaneously on demand by said television viewer, said teletext advertisement contact data block in a first memory means in said active television apparatus, wherein said teletext advertisement contact data block available for acquisition by a data acquisition circuit in said active television apparatus during display of said television advertisement on said active television apparatus;

(d) extracting a multiplicity of said other teletext data block on said active television apparatus, and storing simultaneously each of said other teletext data block in a second memory means in said active television apparatus;

(e) using a remote control device to transmit on-demand by said television viewer, a multiplicity of said teletext advertisement contact data block of said displayed television advertisement picture signal on said active television apparatus from said first memory means in said active television apparatus to a third memory means in said remote control device; and wherein said active television apparatus is a first electronic device and wherein said remote control device is a second electronic device; and wherein said teletext advertisement contact data block embedded in said television advertisement picture signal occurring at an advertisement teletext block insertion time, said advertisement teletext block insertion time occurring in non real-time to said television advertisement picture signal transmission to said active television apparatus; and wherein said page of teletext data is selected from the group comprising an analog teletext system and a digital teletext system.

15. The method of claim 14 comprising additional steps, executed by said television viewer, of:

(f) selecting by said television viewer a specific teletext advertisement contact data block stored simultaneously in said first memory means in said active television apparatus and transmitting said teletext advertisement contact data block to said remote control device;

(g) storing simultaneously by said television viewer said transmitted teletext advertisement contact data block in said third memory means in said remote control device;

(h) navigating by said television viewer said first memory means in said active television apparatus using an input means on said remote control device; and (i) displaying by said television viewer said teletext advertisement contact data block, stored simultaneously in said first memory means in said active television apparatus, on said active television apparatus display using said remote control device.

16. The method of claim 15 comprising additional steps, executed by said television viewer, of:

(j) displaying by said television viewer said teletext advertisement contact data block, stored simultaneously on-demand by said television viewer in said third memory means in said remote control device, on a second display means on said remote control device;

(k) navigating by said television viewer said third memory means in said remote control device using said input means on said remote control device;

(i) using by said television viewer said teletext advertisement contact data block stored simultaneously on-demand by said television viewer in said third memory means in said remote control device to contact a representative of said television advertisement, using a third electronic device over a network means.

17. The third electronic device in claim 16 being selected from the group consisting of a telephone, a computer, a personal digital assistant device and a television set-top box; and wherein said third electronic device comprising an electronic device other than said first electronic device and said second electronic device; and wherein said network means being selected from the group consisting of an internet and a public telephone network.

18. The television picture signal of claim 14 being selected from the group consisting of a cable television signal, a satellite television signal and a broadcast television signal.

19. The method of claim 14 wherein said selected teletext advertisement contact data block is transmitted and printed on a printing device by said television viewer.

20. The method of claim 14 wherein said teletext advertisement contact data block comprises a first tag marking a start of said teletext advertisement contact data block, and a second tag marking an end of said teletext advertisement contact data block, wherein said first tag and said second tag uniquely distinguishing said teletext advertisement contact data block from said other teletext data block.

* * * * *